(12) United States Patent
Nishimoto et al.

(10) Patent No.: US 12,552,759 B2
(45) Date of Patent: Feb. 17, 2026

(54) DIEPOXY COMPOUND, CURABLE COMPOSITION, CURED PRODUCT, AND OPTICAL MEMBER

(71) Applicant: AGC Inc., Tokyo (JP)

(72) Inventors: Nanako Nishimoto, Koriyama (JP); Jun Yoshida, Koriyama (JP)

(73) Assignee: AGC Inc., Tokyo (JP)

( * ) Notice: Subject to any disclaimer, the term of this patent is extended or adjusted under 35 U.S.C. 154(b) by 464 days.

(21) Appl. No.: 18/334,426

(22) Filed: Jun. 14, 2023

(65) Prior Publication Data
US 2023/0331688 A1 Oct. 19, 2023

Related U.S. Application Data

(63) Continuation of application No. PCT/JP2021/045379, filed on Dec. 9, 2021.

(30) Foreign Application Priority Data

Dec. 18, 2020 (JP) ................. 2020-210133

(51) Int. Cl.
| C07D 303/04 | (2006.01) |
| C08G 59/24 | (2006.01) |
| C08L 63/00 | (2006.01) |
| G02B 1/04 | (2006.01) |

(52) U.S. Cl.
CPC .......... *C07D 303/04* (2013.01); *C08G 59/24* (2013.01); *C08L 63/00* (2013.01); *G02B 1/04* (2013.01)

(58) Field of Classification Search
CPC ....... C07D 303/04; C08G 59/24; C08L 63/00; G02B 1/04
See application file for complete search history.

(56) References Cited

U.S. PATENT DOCUMENTS 6,232,411 B1  5/2001  Hara et al.

FOREIGN PATENT DOCUMENTS

| CN | 106916414 A | 7/2017 |
| JP | 11-343286 A | 12/1999 |
| JP | 2004-285125 A | 10/2004 |
| JP | 5000261 B2 | 8/2012 |

OTHER PUBLICATIONS

Ponting et al., "Development of New Epoxy Resin Monomers—A Delicate Balance between Skin Allergy and Polymerization Properties" Chemical Research in Toxicology. 2019, 32 (1), pp. 57-66.

*Primary Examiner* — Alicia L Otton
(74) *Attorney, Agent, or Firm* — Oblon, McClelland, Maier & Neustadt, L.L.P.

(57) ABSTRACT

A diepoxy compound represented by the following formula 1,

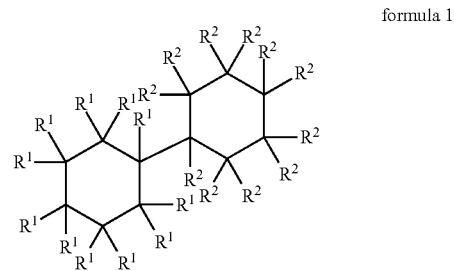

formula 1 where any one of $R^1$ groups is an epoxy group, and the remaining $R^1$ groups each independently represents a hydrogen atom or a linear or branched alkyl group having 1 to 10 carbon atoms, and any one of $R^2$ groups is an epoxy group, and the remaining $R^2$ groups each independently represents a hydrogen atom or a linear or branched alkyl group having 1 to 10 carbon atoms.

13 Claims, No Drawings

DIEPOXY COMPOUND, CURABLE COMPOSITION, CURED PRODUCT, AND OPTICAL MEMBER

CROSS REFERENCE TO RELATED APPLICATIONS

This application is a continuation of PCT/JP2021/045379, filed on Dec. 9, 2021, and claims priority to Japanese Patent Application No. 2020-210133, filed on Dec. 18, 2020. The entire contents of both are incorporated herein by reference.

TECHNICAL FIELD

The present invention relates to a diepoxy compound, a curable composition, a cured product and an optical member.

BACKGROUND ART

Epoxy compounds are used in a wide range of applications.

Cured products obtained by polymerizing the epoxy compounds are excellent in adhesive properties, heat resistance, mechanical properties, electrical properties and light fastness, and are easy to form. Among the epoxy compounds, diepoxy compounds are expected to be applied to optoelectronic fields such as electronic members, optical members, optical semiconductor sealing materials, adhesives for optical members, and stereolithography materials (for example, Patent Documents 1 to 4, Non-Patent Document 1).

CITATION LIST

Patent Documents

[Patent Document 1] Japanese Unexamined Patent Application, First Publication No. Hei 11-343286
[Patent Document 2] Japanese Patent No. 5000261
[Patent Document 3] Japanese Unexamined Patent Application, First Publication No. 2004-285125
[Patent Document 4] Chinese Patent Specification No. 106916414

Non-Patent Document

[Non-Patent Document 1] Chemical Research in Toxicology (2019), 32(1), 57-66

SUMMARY OF INVENTION

Technical Problem

As diepoxy compounds, for example, Patent Documents 1 and 2 disclose a diepoxy compound having a cyclohexane skeleton such as 3',4'-epoxycyclohexylmethyl-3,4-epoxycyclohexanecarboxylate and 2,2-bis[4-(2,3-epoxypropoxy)cyclohexyl] propane.

However, since the diepoxy compounds of Patent Documents 1 and 2 have ester bonds and ether bonds, their cured products are prone to hydrolysis under high temperature and high humidity conditions. In addition, since the water absorption rate is high, the cured products are easily deformed by swelling, and the properties required for optical components, electronic members, and the like may deteriorate.

Diepoxy compounds that do not have an ester bond or an ether bond are also known. For example, Patent Document 3 discloses diepoxy compounds in which two 3,4-epoxycyclohexyl groups are bonded via —$CH_2$—, —$C(CH_3)_2$—, or the like. Non-Patent Document 1 discloses a diepoxy compound in which two cyclohexyl groups having a glycidyl group bonded to the carbon atom at the 4th position are bonded via —$C(CH_3)_2$—. Patent Document 4 discloses a diepoxy compound in which two cyclohexyl groups having an epoxy group bonded to the carbon atom at the 4th position are bonded via —$CH_2CH_2CH(CH_3)$—.

However, it may be difficult, even with the cured products obtained from these diepoxy compounds, to sufficiently reduce the water absorption rate.

One aspect of the present invention provides a diepoxy compound from which a cured product with a low water absorption rate can be obtained; and a curable composition, a cured product and an optical member obtained from the diepoxy compound.

Solution to Problem

The present invention includes the following aspects.
[1] A diepoxy compound represented by the following formula 1.

[Chemical Formula 1]

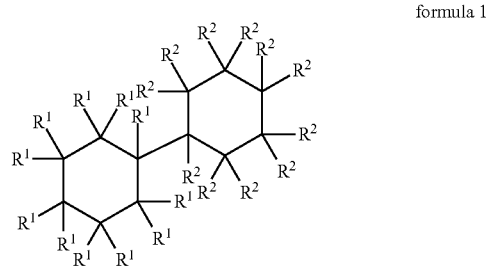

formula 1

In the formula 1, any one of $R^1$ groups is an epoxy group, and the remaining $R^1$ groups each independently represents a hydrogen atom or a linear or branched alkyl group having 1 to 10 carbon atoms. Any one of $R^2$ groups is an epoxy group, and the remaining $R^2$ groups each independently represents a hydrogen atom or a linear or branched alkyl group having 1 to 10 carbon atoms.

[2] The diepoxy compound according to [1], which is a compound represented by the following formula 11.

[Chemical Formula 2]

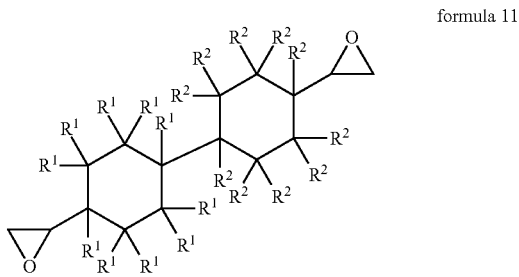

formula 11

In the formula 11, each of $R^1$ and $R^2$ independently represents a hydrogen atom or a linear or branched alkyl group having 1 to 10 carbon atoms.

[3] The diepoxy compound according to [1] or [2], wherein $R^1$ and $R^2$ that are not epoxy groups are each independently a hydrogen atom or a linear or branched alkyl group having 1 to 6 carbon atoms.

[4] The diepoxy compound according to [1] or [2], wherein $R^1$ and $R^2$ that are not epoxy groups are all hydrogen atoms.

[5] A diepoxy compound represented by the following formula 2.

[Chemical Formula 3]

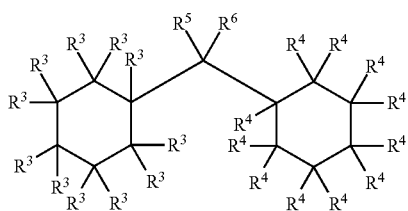

formula 2

In the formula 2, any one of $R^3$ groups is an epoxy group, and the remaining $R^3$ groups each independently represents a hydrogen atom or a linear or branched alkyl group having 1 to 10 carbon atoms. Any one of $R^4$ groups is an epoxy group, and the remaining $R^4$ groups each independently represents a hydrogen atom or a linear or branched alkyl group having 1 to 10 carbon atoms. Each of $R^5$ and $R^6$ independently represents a hydrogen atom or a linear or branched alkyl group having 1 to 10 carbon atoms. $R^5$ and $R^6$ may be bonded to each other to form a ring structure.

[6] The diepoxy compound according to [5], which is a compound represented by the following formula 21.

[Chemical Formula 4]

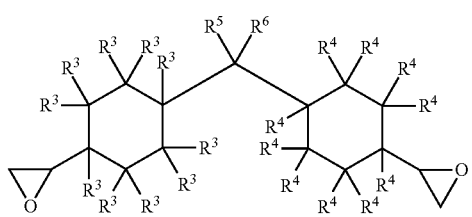

formula 21

In the formula 21, each of $R^3$ and $R^4$ independently represents a hydrogen atom or a linear or branched alkyl group having 1 to 10 carbon atoms.

[7] The diepoxy compound according to [5] or [6], wherein $R^3$ and $R^4$ that are not epoxy groups are each independently a hydrogen atom, or a linear or branched alkyl group having 1 to 6 carbon atoms; and each of $R^5$ and $R^6$ independently represents a hydrogen atom, or a linear or branched alkyl group having 1 to 6 carbon atoms.

[8] The diepoxy compound according to any one of [5] to [7], wherein $R^3$ and $R^4$ that are not epoxy groups are all hydrogen atoms.

[9] The diepoxy compound according to [8], wherein $R^5$ and $R^6$ are methyl groups.

[10] A curable composition comprising the diepoxy compound according to any one of [1] to [9] and an initiator.

[11] A cured product of the curable composition according to [10].

The cured product according to [11], which has a water absorption rate of 0.45% or less when exposed to distilled water at 23° C. for 24 hours.

[13] An optical member comprising the cured product according to [11] or [12].

Effects of Invention

According to one aspect of the present invention, there are provided a diepoxy compound from which a cured product with a low water absorption rate can be obtained; and a curable composition, a cured product and an optical member obtained from the diepoxy compound.

DESCRIPTION OF EMBODIMENTS

A water absorption rate is measured by the method described in Examples.

A numerical range represented by a symbol "-" means a numerical range that includes numerical values before and after this symbol "-" as the lower limit and upper limit values.

The numerical ranges of the contents, various physical property values, and property values disclosed in the present specification can be made into new numerical ranges by arbitrarily combining the lower limit and upper limit values thereof.

Diepoxy Compound

A diepoxy compound of a first aspect of the present invention is a compound represented by the following formula 1 (hereinafter also referred to as a "compound A").

[Chemical Formula 5]

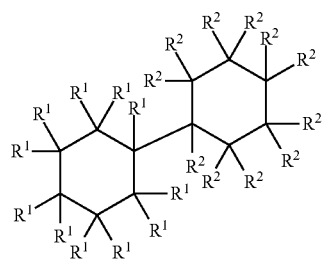

formula 1

In the formula 1, any one of $R^1$ groups is an epoxy group, and the remaining $R^1$ groups each independently represents a hydrogen atom or a linear or branched alkyl group having 1 to 10 carbon atoms. Further, any one of $R^2$ groups is an epoxy group, and the remaining $R^2$ groups each independently represents a hydrogen atom or a linear or branched alkyl group having 1 to 10 carbon atoms.

The epoxy group represented by $R^1$ may be bonded to any carbon atom in a cyclohexane ring to which a plurality of $R^1$ groups are bonded. From the viewpoint of ease of production, the epoxy group represented by $R^1$ is preferably bonded to the carbon atom at the 4th position of the cyclohexane ring to which a plurality of $R^1$ groups are bonded.

A plurality of $R^1$ groups that are not epoxy groups may be the same group or different groups. From the viewpoint of water absorption rate, $R^1$ that is not an epoxy group is preferably a hydrogen atom or a linear or branched alkyl group having 1 to 6 carbon atoms, and is particularly preferably a hydrogen atom.

The epoxy group represented by $R^2$ may be bonded to any carbon atom in the cyclohexane ring to which a plurality of $R^2$ groups are bonded. From the viewpoint of ease of production, the epoxy group represented by $R^2$ is preferably bonded to the carbon atom at the 4th position of the cyclohexane ring to which a plurality of $R^2$ groups are bonded.

A plurality of $R^2$ groups that are not epoxy groups may be the same group or different groups. $R^2$ that is not an epoxy group may be the same group as $R^1$ that is not an epoxy group, or may be a different group therefrom. From the viewpoint of water absorption rate, $R^2$ that is not an epoxy group is preferably a hydrogen atom or a linear or branched alkyl group having 1 to 6 carbon atoms, and is particularly preferably a hydrogen atom.

From the viewpoint of water absorption rate, the compound A is preferably a compound represented by the following formula 11 (hereinafter also referred to as a "compound A1").

[Chemical Formula 6]

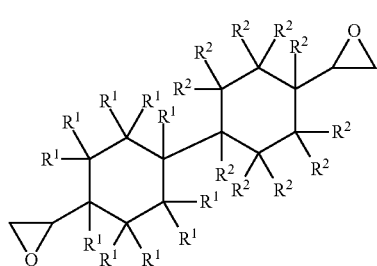

formula 11

In the formula 11, each of $R^1$ and $R^2$ independently represents a hydrogen atom or a linear or branched alkyl group having 1 to 10 carbon atoms.

The preferred embodiments of $R^1$ and $R^2$ in the above formula 11 are the same as the preferred embodiments of $R^1$ and $R^2$ that are not epoxy groups in the above formula 1.

From the viewpoint of ease of production, the compound A1 is particularly preferably a compound in which $R^1$ and $R^2$ in the above formula 11 are all hydrogen atoms, that is, a compound represented by the following formula 12 (hereinafter also referred to as a "compound A1-1").

[Chemical Formula 7]

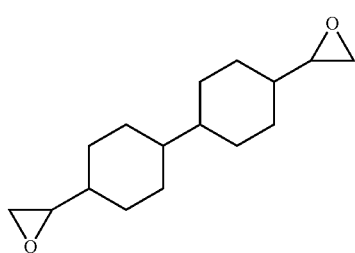

formula 12

A method for synthesizing the compound A is not particularly limited. The compound A can be synthesized by appropriately combining various reactions. For example, when a compound in which two epoxy groups in the compound A are substituted with hydroxy groups is used as a starting material, this starting material is reacted with a silylating agent (such as tert-butyldimethylchlorosilane) to replace the two hydroxy groups with silyl groups, thereby forming a disilyl product. The disilyl product is then reacted with a halide (such as boron tribromide) to replace the two silyl groups with halogen atoms by desilylation and halogenation, thereby forming a dihalogenated product. Next, the dihalogenated product and vinylmagnesium bromide are subjected to a cross-coupling reaction in the presence of a copper catalyst (such as $CuCl_2$), and then reacted with a peroxide (such as meta-chloroperoxybenzoic acid) to epoxidize the vinyl group, thereby obtaining the compound A.

A solvent used for synthesizing the compound A may be appropriately selected within a range that does not adversely affect each reaction. Examples thereof include dimethylformamide, dichloromethane, tetrahydrofuran, halogenated hydrocarbons (such as dichloromethane), ethers (such as diethyl ether and tetrahydrofuran), aromatic hydrocarbons (such as benzene and toluene), aliphatic hydrocarbons (such as hexane and pentane), and amide-based solvents (such as N,N-dimethylformamide and N-methylpyrrolidone).

A diepoxy compound of a second aspect of the present invention is a compound represented by the following formula 2 (hereinafter also referred to as a "compound B").

[Chemical Formula 8]

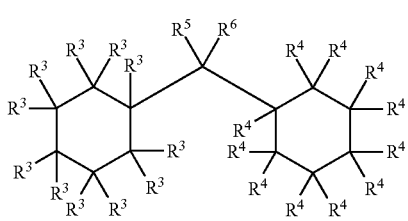

formula 2

In the formula 2, any one of $R^3$ groups is an epoxy group, and the remaining $R^3$ groups each independently represents a hydrogen atom or a linear or branched alkyl group having 1 to 10 carbon atoms. Further, any one of $R^4$ groups is an epoxy group, and the remaining $R^4$ groups each independently represents a hydrogen atom or a linear or branched alkyl group having 1 to 10 carbon atoms.

Each of $R^5$ and $R^6$ independently represents a hydrogen atom or a linear or branched alkyl group having 1 to 10 carbon atoms. $R^5$ and $R^6$ may be bonded to each other to form a ring structure.

The epoxy group represented by $R^3$ may be bonded to any carbon atom in the cyclohexane ring to which a plurality of $R^3$ groups are bonded. From the viewpoint of ease of production, the epoxy group represented by $R^3$ is preferably bonded to the carbon atom at the 4th position of the cyclohexane ring to which a plurality of $R^3$ groups are bonded.

A plurality of $R^3$ groups that are not epoxy groups may be the same group or different groups. From the viewpoint of water absorption rate, $R^3$ that is not an epoxy group is preferably a hydrogen atom or a linear or branched alkyl group having 1 to 6 carbon atoms, and is particularly preferably a hydrogen atom.

The epoxy group represented by $R^4$ may be bonded to any carbon atom in the cyclohexane ring to which a plurality of $R^4$ groups are bonded. From the viewpoint of ease of production, the epoxy group represented by $R^4$ is preferably bonded to the carbon atom at the 4th position of the cyclohexane ring to which a plurality of $R^4$ groups are bonded.

A plurality of $R^4$ groups that are not epoxy groups may be the same group or different groups. $R^4$ that is not an epoxy group may be the same group as $R^3$ that is not an epoxy group, or may be a different group therefrom. From the viewpoint of water absorption rate, $R^4$ that is not an epoxy group is preferably a hydrogen atom or a linear or branched alkyl group having 1 to 6 carbon atoms, and is particularly preferably a hydrogen atom.

$R^5$ and $R^6$ may be the same group or different groups. When $R^5$ and $R^6$ form a ring structure, it is a cycloalkyl group. When $R^5$ and $R^6$ form a ring structure, a cycloalkyl group having 5 to 12 carbon atoms is preferred, and a cycloalkyl group having 6 or less carbon atoms is more preferred. The ring structure formed by $R^5$ and $R^6$ may be a monocyclic structure or a polycyclic structure.

From the viewpoint of ease of production, $R^5$ and $R^6$ are each independently preferably a hydrogen atom or a linear or branched alkyl group having 1 to 6 carbon atoms, more preferably a methyl group or an ethyl group, and particularly preferably a methyl group.

From the viewpoint of water absorption rate, the compound B is preferably a compound represented by the following formula 21 (hereinafter also referred to as a "compound B1").

[Chemical Formula 9]

formula 21

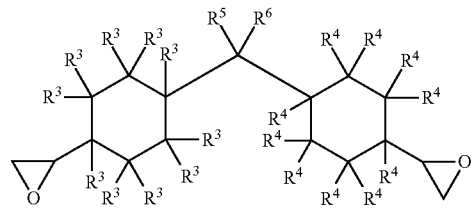

In the formula 21, each of $R^3$ and $R^4$ independently represents a hydrogen atom or a linear or branched alkyl group having 1 to 10 carbon atoms. $R^5$ and $R^6$ are the same as those defined in the above formula 2.

The preferred embodiments of $R^3$ to $R^6$ in the above formula 21 are the same as the preferred embodiments of $R^3$ that is not an epoxy group, and those of $R^4$, $R^5$, and $R^6$ in the above formula 2.

As the compound B1, for example, a compound represented by the following formula 22 (hereinafter also referred to as a "compound B1-1") can be exemplified. Examples of the compound B1 in which $R^5$ and $R^6$ form a ring structure include compounds represented by the following formula 23 and compounds represented by the following formula 24.

[Chemical Formula 10]

formula 22

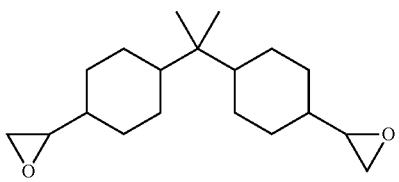

-continued formula 23

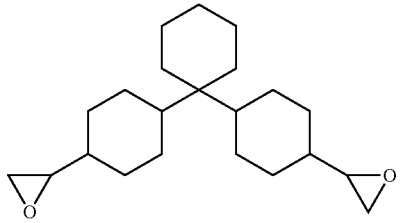

formula 24

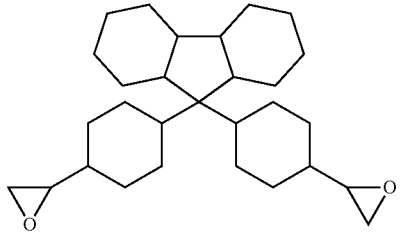

From the viewpoint of ease of production, the compound B1 is particularly preferably the compound B1-1, that is, a compound in which $R^3$ and $R^4$ in the above formula 21 are all hydrogen atoms, and $R^5$ and $R^6$ are methyl groups.

A method for synthesizing the compound B is not particularly limited. The compound B can be synthesized by appropriately combining various reactions. For example, the compound B can be synthesized in the same manner as the method exemplified for synthesizing the compound A, with the exception that a compound in which two epoxy groups in the compound B are substituted with hydroxy groups is used as a starting material.

Curable Composition

A curable composition of the present invention comprises the diepoxy compound of the present invention and an initiator. A cured product can be obtained by curing the curable composition of the present invention by performing light irradiation, heating, or the like, depending on the type of the initiator.

The curable composition of the present invention may comprise only either one of the compound A and the compound B as a diepoxy compound, or may comprise both. The number of types of the compound A in the curable composition may be one, or two or more. The number of types of the compound B in the curable composition may be one, or two or more.

The curable composition of the present invention may further comprise epoxy compounds other than the compound A and the compound B, oxetane compounds, and the like as resin components as long as they do not impair the effects of the present invention.

Examples of oxetane compounds include various monofunctional oxetane compounds and polyfunctional oxetane compounds. Examples of monofunctional oxetane compounds include 3-ethyl-3-(2-ethylhexyloxymethyl)oxetane. Examples of polyfunctional oxetane compounds include 3-ethyl-3-{[(3-ethyloxetan-3-yl)methoxy]methyl}oxetane.

Examples of other epoxy compounds include 2,2-bis[4-(2,3-epoxypropoxy)cyclohexyl]propane.

The number of types of resin components in the curable composition other than the compound A and the compound B may be one, or two or more.

The initiator that initiates curing of the curable composition of the present invention is not particularly limited. For example, initiators that generate cationic species by light irradiation or heating can be exemplified. The initiator in the curable composition may be one type or two or more types.

The initiator that generates cationic species by light irradiation is not particularly limited. For example, an ultraviolet cationic polymerization initiator that generates a cationically polymerizable acid upon irradiation with ultraviolet rays can be exemplified.

An ultraviolet cationic polymerization initiator generates an acid that can be cationically polymerized by irradiation with ultraviolet rays. Examples thereof include diazonium salt-based compounds, iodonium salt-based compounds, sulfonium salt-based compounds, phosphonium salt-based compounds, selenium salt-based compounds, oxonium salt-based compounds, ammonium salt-based compounds, and bromine salt-based compounds.

Examples of the anionic component of the ultraviolet cationic polymerization initiator include $SbF_6^-$, $PF_6^-$, $BF_4^-$, $AsF_6^-$, and $B(C_6F_5)_4^-$. From the viewpoint of curability, onium salts such as aromatic sulfonium salts comprising $B(C_6F_5)_4^-$, $PF_6^-$ or $SbF_6^-$ as an anionic component are preferred, and onium salts such as aromatic sulfonium salts comprising $B(C_6F_5)_4^-$ as an anionic component are more preferred. The number of types of the ultraviolet cationic polymerization initiators in the curable resin composition may be one, or two or more.

The curable composition of the present invention may further comprise an additive as necessary. Examples of the additive include coupling agents (such as silane-based coupling agents and titanium-based coupling agents), flexibility imparting agents (such as synthetic rubbers and polyorganosiloxanes), antioxidants, antifoaming agents, hydrocarbon-based waxes and inorganic fillers.

The total content of the compound A and the compound B in the curable composition of the present invention is preferably from 50 to 100% by mass, and more preferably from 60 to 100% by mass, with respect to the total mass of the resin components in the curable composition. When the total content of the compound A and the compound B is equal to or more than the lower limit value of the above range, the water absorption rate of the cured product will be low, and the deformation due to swelling will be less likely to occur even in a high temperature and high humidity environment.

The content of the initiator in the curable composition of the present invention is preferably from 0.1 to 2.0 parts by mass, and more preferably from 0.2 to 1.0 parts by mass, with respect to 100 parts by mass of the resin components in the curable composition. When the content of the initiator is equal to or more than the lower limit value of the above range, the curability improves. When the content of the initiator is equal to or less than the upper limit value of the above range, coloring of the cured product can be easily suppressed.

Cured Product

The cured product of the present invention is a cured product of the curable composition of the present invention. The shape and dimensions of the cured product are not particularly limited, and can be appropriately set in accordance with the application.

The application of the cured product of the present invention is not particularly limited. Examples thereof include electronic members, optical members, optical semiconductor sealing materials, adhesives for optical members, and stereolithography materials. Among them, the cured product of the present invention is useful as an optical member because it has a low water absorption rate and is less susceptible to deformation.

When the cured product of the present invention is exposed to distilled water at 23° C. for 24 hours, the water absorption rate is preferably 0.45% or less, more preferably 0.40% or less, and still more preferably 0.35% or less. If the water absorption rate is equal to or less than the above upper limit value, deformation due to swelling is less likely to occur even in a high temperature and high humidity environment, and deterioration of the properties required for optical components, electronic components, and the like is suppressed. The lower the water absorption rate of the cured product, the better, and the substantial lower limit is about 0.10%.

As described above, in the present invention, by using the compound A and the compound B that are diepoxy compounds, a cured product having a low water absorption rate can be obtained. Therefore, the cured product is less likely to be deformed by swelling, and the properties required for optical components, electronic components, and the like are less likely to deteriorate. In addition, since the compound A and the compound B do not have an ester bond or an ether bond, hydrolysis does not occur even under high temperature and high humidity conditions, and the durability is excellent.

EXAMPLES

The present invention will be described in detail below with reference to Examples, but the present invention is not limited by the following description. Cases 1 and 2 are Examples of the present invention. Cases 3 to 6 are Comparative Examples.

Synthesis Example 1

A compound B1-1 was synthesized by the following procedure.

A reaction represented by the following formula 3 was carried out. 2,2-Bis(4-hydroxycyclohexyl)propane (30 g, 128.9 mmol) was dissolved in dimethylformamide (DMF, 500 mL), and imidazole (38.3 g, 562 mmol) and tert-butyldimethylchlorosilane (TBDMSCl, 84.7 g, 562 mmol) were further added thereto at 0° C., and the resulting mixture was stirred overnight at room temperature under a nitrogen atmosphere. After completion of the reaction, a mixed solvent of ethyl acetate/hexane (=¼) and water were added to extract the reactant. Then, the resulting reactant was washed twice with water and the solvent was removed to obtain a disilyl product (58.3 g) as a white solid.

The disilyl product (42.4 g) was dissolved in dichloromethane (480 mL), a 1M dichloromethane solution (275 mL) of boron tribromide was added dropwise at 0° C., and after completion of the dropwise addition, the reaction was allowed to proceed overnight at room temperature. After completion of the reaction, the reaction solution was added to a saturated aqueous sodium bicarbonate solution, and the resulting mixture was stirred for 10 minutes, and then extracted. Then, the resulting product was washed twice with water, the solvent was removed, and a transparent oily dibromo product (30.0 g, 82.4 mmol) was isolated by flash column chromatography (5% ethyl acetate/hexane solution). The total yield for the reaction of the formula 3 was 88.3%.

[Chemical Formula 11]

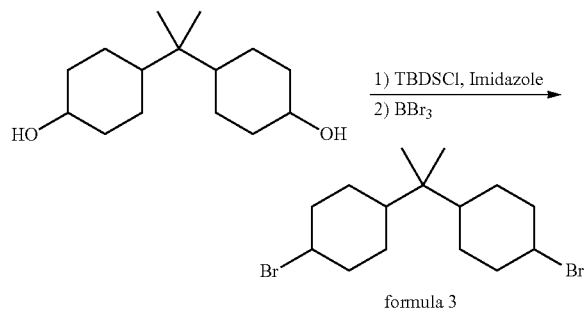

formula 3

Then, a reaction represented by the following formula 4 was carried out.

The dibromo product (30 g, 82.4 mmol) was dissolved in tetrahydrofuran (THF, 180 mL), ethynylbenzene (0.93 g, 8.2 mmol) and $CuCl_2$ (2.2 g, 16.4 mmol) were added thereto at 0° C., and a 1M THF solution (300 ml) of vinylmagnesium bromide was added dropwise at 0° C. under a nitrogen atmosphere. After completion of the dropwise addition, the resulting mixture was stirred overnight at room temperature, a 10% hydrochloric acid solution was then added thereto to terminate the reaction, and the reactant was extracted with ethyl acetate. Then, the resulting reactant was washed twice with water, the solvent was removed, and a transparent oily diene (15.1 g, 58.0 mmol, 70.4%) was isolated by flash column chromatography (5% ethyl acetate/hexane solution).

[Chemical Formula 12]

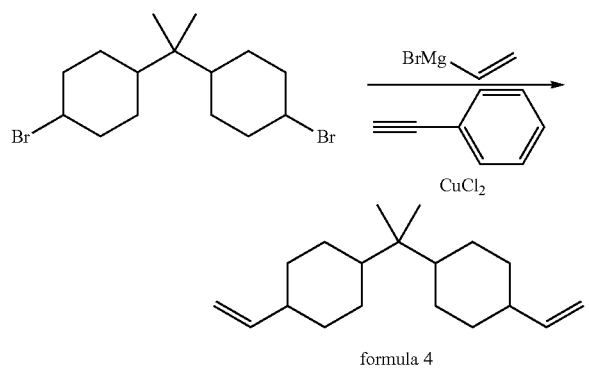

formula 4

A reaction represented by the following formula 5 was carried out. The diene (15.1 g, 58.0 mmol) was dissolved in dichloromethane (330 ml), meta-chloroperoxybenzoic acid (61.6 g, 232.0 mmol) was added thereto at 0° C., and the resulting mixture was stirred overnight at room temperature. The reaction solution was added to a saturated aqueous sodium sulfite solution to terminate the reaction, and the reactant was extracted. Then, the resulting reactant was washed with water, the solvent was removed, and a transparent oily compound (B1-1) (4.5 g, 15.4 mmol, 26.6%) was isolated by flash column chromatography (ethyl acetate/hexane (=1/6) solution).

The NMR spectrum of the compound (B1-1) is shown below.

$^1$H-NMR (400 MHz, solvent: $CDCl_3$, standard: tetramethylsilane (TMS)) δ (ppm): 3.11-2.50 (m, 6H), 1.99-1.96 (m, 2H), 1.76-1.73 (m, 5H), 1.58-1.55 (m, 2H), 1.34-1.00 (m, 11H), 0.76-0.71 (m, 6H)

[Chemical Formula 13]

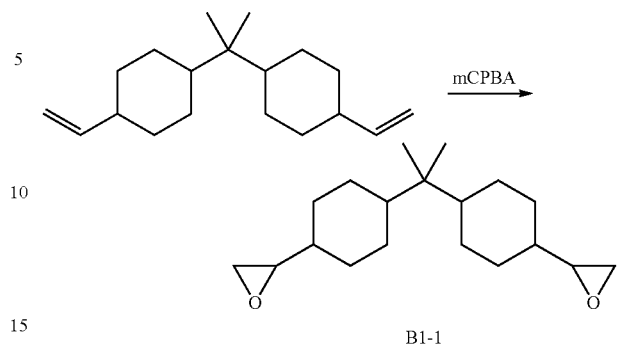

B1-1

Synthesis Example 2

A compound A1-1 was synthesized by the following procedure.

A reaction represented by the following formula 6 was carried out. 4,4-Bicyclohexanol (50 g, 252.1 mmol) was dissolved in DMF (500 mL), and imidazole (41.0 g, 602.2 mmol) and TBDMSCl (92.0 g, 610.4 mmol) were further added at 0° C., and the resulting mixture was stirred overnight at room temperature under a nitrogen atmosphere. After completion of the reaction, a mixed solvent of ethyl acetate/hexane (=1/4) and water were added to extract the reactant. Then, the resulting reactant was washed twice with water and the solvent was removed to obtain a disilyl product (70.34 g) as a white solid.

The disilyl product (70.34 g) was dissolved in dichloromethane (600 ml), a 1M dichloromethane solution (400 ml) of boron tribromide was added dropwise at 0° C., and after completion of the dropwise addition, the reaction was allowed to proceed overnight at room temperature. After completion of the reaction, the reaction solution was added to a saturated aqueous sodium bicarbonate solution, the resulting mixture was stirred for 10 minutes, and then the reactant was extracted. Then, the resulting reactant was washed twice with water, the solvent was removed, and a transparent oily dibromo product (57.0 g, 177.1 mmol) was isolated by flash column chromatography (5% ethyl acetate/hexane solution). The total yield for the reaction of the formula 6 was 70.2%.

[Chemical Formula 14]

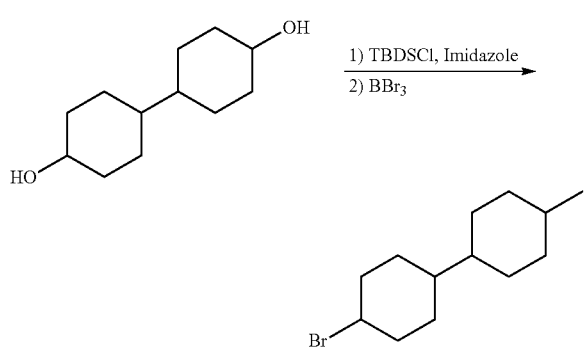

A reaction represented by a formula 7 was carried out. The dibromo product (29.1 g, 90.3 mmol) was dissolved in THF (180 mL), ethynylbenzene (1.1 g, 9.0 mmol) and CuCl$_2$ (2.4 g, 18.1 mmol) were added thereto at 0° C., and a 1M THF solution (270 mL) of vinylmagnesium bromide was added dropwise at 0° C. under a nitrogen atmosphere. After completion of the dropwise addition, the resulting mixture was stirred overnight at room temperature, a 10% hydrochloric acid solution was then added thereto to terminate the reaction, and the reactant was extracted with ethyl acetate. Then, the resulting reactant was washed twice with water, the solvent was removed, and a transparent oily diene (11.0 g, 50.6 mmol, 56.0%) was isolated by flash column chromatography (5% ethyl acetate/hexane solution).

[Chemical Formula 15]

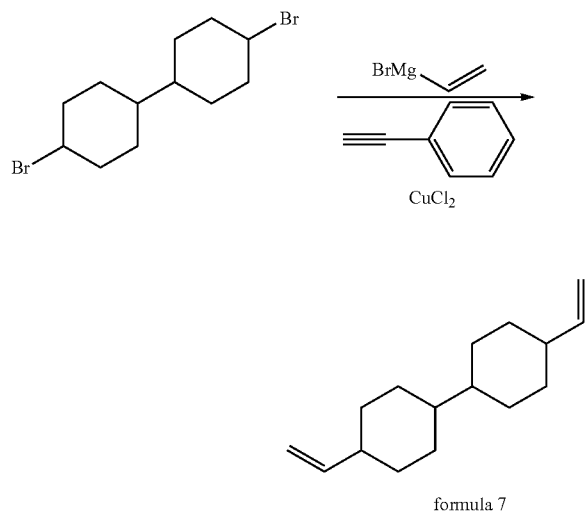

formula 7

A reaction represented by a formula 8 was carried out. The diene (21.6 g, 98.9 mmol) was dissolved in dichloromethane (400 ml), meta-chloroperoxybenzoic acid (105.0 g, 395.6 mmol) was added thereto at 0° C., and the resulting mixture was stirred overnight at room temperature. The reaction solution was added to a saturated aqueous sodium sulfite solution to terminate the reaction, and the reactant was extracted. Then, the resulting reactant was washed with water, the solvent was removed, and a transparent oily compound A1-1 (5.5 g, 21.8 mmol, 22.0%) was isolated by flash column chromatography (ethyl acetate/hexane (=⅙) solution).

The NMR spectrum of the compound (A1-1) is shown below.

$^1$H-NMR (400 MHz, solvent: CDCl$_3$, standard: TMS) δ (ppm): 2.96-2.46 (m, 6H), 1.94-0.88 (m, 20H)

[Chemical Formula 16]

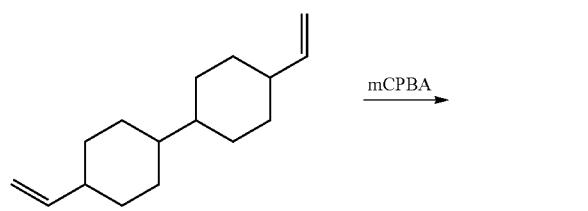

-continued

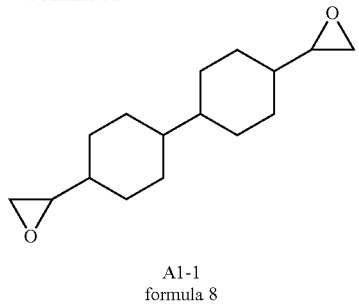

A1-1
formula 8

Case 1

A curable composition was prepared by adding 0.5 parts by mass of an ultraviolet cationic polymerization initiator (Irgacure 290, manufactured by BASF Corporation) to 100 parts by mass of the compound B1-1 obtained in Synthesis Example 1.

Two disk-shaped glass substrates that had undergone a mold release treatment were prepared. On one glass substrate, the other glass substrate was placed in parallel so that the distance between the glass substrates was 1.0 mm. The curable composition was poured between the two glass substrates so as not to arise air bubbles. Then, the curable composition sandwiched between the two glass substrates was irradiated with ultraviolet rays (using an LED lamp with a wavelength of 365 nm) at an exposure amount of 4,500 mJ/cm$^2$, and then allowed to stand at room temperature for 15 minutes. About 0.5 g of a disk-shaped cured product with a thickness of 1.0 mm was released from the two glass substrates, and the cured product released from the mold was subjected to a heat treatment under the conditions of 180° C. for 3 hours in a nitrogen atmosphere, and was used as a sample for evaluation.

Case 2

A sample for evaluation was obtained in the same manner as in Case 1, with the exception that the compound A1-1 obtained in Synthesis Example 2 was used instead of the compound B1-1. In more detail, the compound A1-1 was used to prepare a curable composition, and after that, a cured product was produced under the same conditions as in Case 1 and used as a sample for evaluation.

Case 3

A curable composition was prepared in the same manner as in Case 1 with the exception that 3',4'-epoxycyclohexylmethyl-3,4-epoxycyclohexanecarboxylate (CEL-2021P, manufactured by Daicel Corporation) was used instead of the compound B1-1. A cured product was produced and used as a sample for evaluation under the same conditions as in Case 1, with the exception that, after using the curable composition and irradiating it with ultraviolet rays at an exposure amount of 9,000 mJ/cm$^2$ using an LED lamp with a wavelength of 365 nm, curing conditions were changed so that it was heated at 60° C. for 5 minutes and then at 80° C. for 5 minutes instead of being allowed to stand at room temperature.

Case 4

A curable composition was prepared in the same manner as in Case 1 with the exception that 2,2-bis[4-(2,3-epoxypropoxy)cyclohexyl]propane (YX-8000, manufactured by Mitsubishi Chemical Corporation) was used instead of the compound B1-1. Using the curable composition, a cured product was produced and used as a sample for evaluation under the same conditions as in Case 1, with the exception that the curable composition was not allowed to stand at room temperature after the ultraviolet irradiation.

Case 5

A sample for evaluation was obtained in the same manner as in Case 4, with the exception that a compound C-1 represented by the following formula C-1 was used instead of the compound B1-1. In more detail, a curable composition was prepared using the compound C-1, and after that, a cured product was produced under the same conditions as in Case 4 and used as a sample for evaluation.

[Chemical Formula 17]

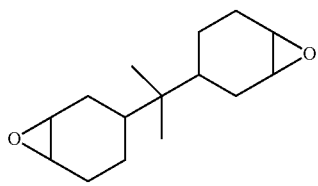

formula C-1

Case 6

A sample for evaluation was obtained in the same manner as in Case 4, with the exception that a compound C-2 represented by the following formula C-2 was used instead of the compound B1-1. In more detail, a curable composition was prepared using the compound C-2, and after that, a cured product was produced under the same conditions as in Case 4 and used as a sample for evaluation.

[Chemical Formula 18]

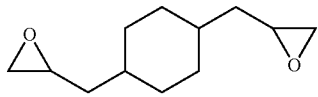

formula C-2

Water Absorption Rate

The sample for evaluation of each Case was dried under reduced pressure, the sample for evaluation after being dried under reduced pressure was weighed, and the weighed value was defined as $W_A$. Further, after exposing the sample for evaluation to distilled water at 23° C. for 24 hours, the sample for evaluation was weighed again, and the weighed value was defined as $W_B$. Using these weighed values, the water absorption rate was calculated from the following formula. The water absorption rate was measured for 3 to 5 samples for evaluation under the same conditions, and the average value thereof was taken as the water absorption rate of the cured product of each example. Table 1 shows the evaluation results of each example.

Water absorption rate (%)=$((W_B-W_A)/W_A) \times 100$

TABLE 1

| | Diepoxy compound | Water absorption rate [%] |
|---|---|---|
| Case 1 | B1-1 | 0.15 |
| Case 2 | A1-1 | 0.27 |
| Case 3 | CEL-2021P | 1.45 |
| Case 4 | YX-8000 | 0.52 |
| Case 5 | C-1 | 0.51 |
| Case 6 | C-2 | 0.53 |

As shown in Table 1, the cured products of Cases 1 and 2 had lower water absorption rates than those of the cured products of Cases 3 to 6.

INDUSTRIAL APPLICABILITY

According to one aspect of the present invention, there are provided a diepoxy compound from which a cured product with a low water absorption rate can be obtained; and a curable composition, a cured product and an optical member using the diepoxy compound.

This application is a continuation application of International Application No. PCT/JP2021/045379, filed on Dec. 9, 2021, which claims the benefit of priority of the prior Japanese Patent Application No. 2020-210133, filed Dec. 18, 2020, the entire contents of the specification, claims, drawings, and abstract of which are referenced and incorporated herein as the disclosure of the specification of the present invention.

The invention claimed is:

1. A diepoxy compound represented by the following formula 1,

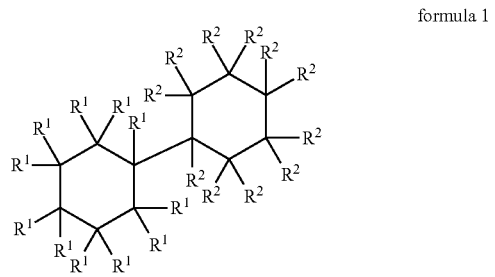

formula 1 wherein any one of $R^1$ groups is an epoxy group, and the remaining $R^1$ groups each independently represents a hydrogen atom or a linear or branched alkyl group having 1 to 10 carbon atoms, and any one of $R^2$ groups is an epoxy group, and the remaining $R^2$ groups each independently represents a hydrogen atom or a linear or branched alkyl group having 1 to 10 carbon atoms.

2. The diepoxy compound according to claim 1, which is a compound represented by the following formula 11,

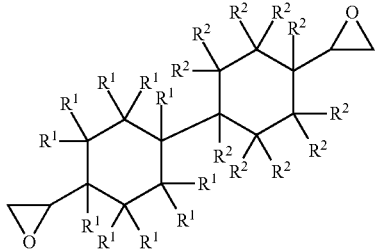

formula 11 wherein each of $R^1$ and $R^2$ independently represents a hydrogen atom or a linear or branched alkyl group having 1 to 10 carbon atoms.

3. The diepoxy compound according to claim 1, wherein $R^1$ and $R^2$ that are not epoxy groups are each independently a hydrogen atom or a linear or branched alkyl group having 1 to 6 carbon atoms.

4. The diepoxy compound according to claim 1, wherein $R^1$ and $R^2$ that are not epoxy groups are all hydrogen atoms.

5. A diepoxy compound represented by the following formula 2,

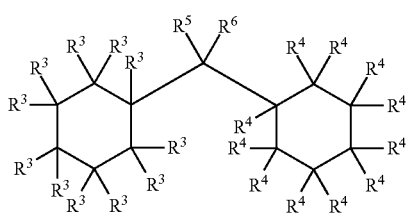

formula 2 wherein any one of $R^3$ groups is an epoxy group, and the remaining $R^3$ groups each independently represents a hydrogen atom or a linear or branched alkyl group having 1 to 10 carbon atoms, any one of $R^4$ groups is an epoxy group, and the remaining $R^4$ groups each independently represents a hydrogen atom or a linear or branched alkyl group having 1 to 10 carbon atoms, each of $R^5$ and $R^6$ independently represents a hydrogen atom or a linear or branched alkyl group having 1 to 10 carbon atoms, and $R^5$ and $R^6$ may be bonded to each other to form a ring structure.

6. The diepoxy compound according to claim 5, which is a compound represented by the following formula 21,

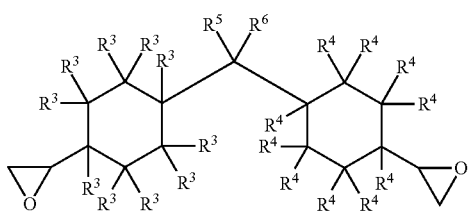

formula 21 wherein each of $R^3$ and $R^4$ independently represents a hydrogen atom or a linear or branched alkyl group having 1 to 10 carbon atoms.

7. The diepoxy compound according to claim 5, wherein $R^3$ and $R^4$ that are not epoxy groups are each independently a hydrogen atom or a linear or branched alkyl group having 1 to 6 carbon atoms, and each of $R^5$ and $R^6$ independently represents a hydrogen atom or a linear or branched alkyl group having 1 to 6 carbon atoms.

8. The diepoxy compound according to claim 5, wherein $R^3$ and $R^4$ that are not epoxy groups are all hydrogen atoms.

9. The diepoxy compound according to claim 8, wherein $R^5$ and $R^6$ are methyl groups.

10. A curable composition comprising:
the diepoxy compound according to claim 1; and
an initiator.

11. A cured product of the curable composition according to claim 10.

12. The cured product according to claim 11, which has a water absorption rate of 0.45% or less when exposed to distilled water at 23° C. for 24 hours.

13. An optical member comprising the cured product according to claim 11.

\* \* \* \* \*